United States Patent

Bunge et al.

[11] Patent Number: 5,896,447
[45] Date of Patent: Apr. 20, 1999

[54] METHOD FOR ACCOMMODATING PORTED DIRECTORY NUMBERS AFFECTED BY CALL BLOCK CONTROLS IMPLEMENTED IN A TELECOMMUNICATIONS NETWORK

[75] Inventors: Jean Marie Bunge, Clare; Susan Maureen Harrigan, Downers Grove; Wayne Ronald Kalbow, Glen Ellyn; John William Russell, Naperville; Barbara Joan Schlaman, Naperville; Susan Marie Trebs, Crete, all of Ill.

[73] Assignee: Lucent Technologies Inc., Murray Hill, N.J.

[21] Appl. No.: 08/733,376

[22] Filed: Oct. 17, 1996

[51] Int. Cl.[6] ............... H04M 3/42; H04M 15/00; H04M 7/00
[52] U.S. Cl. ............... 379/211; 379/134; 379/139; 379/220; 379/230
[58] Field of Search ............... 379/111, 112, 379/113, 114, 115, 133, 134, 139, 207, 211, 219, 220, 221, 230, 258

[56] References Cited

U.S. PATENT DOCUMENTS 5,610,915  3/1997  Elliott et al. ............... 379/207 X
5,661,782  8/1997  Bartholomew et al. ........ 379/230 X Primary Examiner—Harry S. Hong
Attorney, Agent, or Firm—Mony R. Ghose

[57] ABSTRACT

A method for implementing call blocking controls in a telecommunications system supporting ported directory numbers comprises initializing each switch with a call blocking control. In the preferred embodiment, ported directory numbers are identified, and a number portability data base is accessed to aid in determining whether the call blocking control applies to the ported directory number. If the ported directory number is not subject to the implemented call blocking control, the ported directory number is exempted.

7 Claims, 2 Drawing Sheets

METHOD FOR ACCOMMODATING PORTED DIRECTORY NUMBERS AFFECTED BY CALL BLOCK CONTROLS IMPLEMENTED IN A TELECOMMUNICATIONS NETWORK

FIELD OF THE INVENTION

This invention relates to the field of telecommunications networks, and more particularly, to exempting ported directory numbers from call block controls implemented in such telecommunications networks.

BACKGROUND OF THE INVENTION

The United States telecommunications industry is in a state of transition. During the next several years, it is expected that the monopoly held by local exchange carriers will be substantially altered, and competitive access providers will begin to offer customer service for both toll, and local exchange calls. To facilitate this transition without creating an excessive burden on subscribers of a competitive access provider, a requirement for service provider number portability is anticipated. Service provider number portability is defined as a change in service provider without a change in directory number. Eventually, location number portability will also be available so that customers can move to other geographic locations without a change in directory number.

Number portability, regardless of type, significantly impacts call routing in the existing telecommunications network. This is because calls between telephone customers in the United States are established on the basis of a national directory number plan, wherein each customer line is identified by a 10-digit directory number having geographic, and central office switch significance. The 10-digit directory number comprises a three-digit area code (generally denoted by the letters "NPA") defining a specific geographic region, followed by a three-digit office code (denoted by the letters "NXX") identifying a particular central office switch in the network. The remaining four digits are customer line identifiers (denoted by the letters "XXXX") for establishing the line address of a particular customer line served by the central office switch identified by the NXX digits. Customers who change service providers while retaining their directory number are typically served by a central office switch which normally serves NPA-NXX digits different than the NPA-NXX digits of the customer's directory number. In other words, such customers have "ported" their directory numbers.

Ported directory numbers require special accommodations in the existing telecommunications network. One example of such an accommodation is the implementation of a location routing number (LRN) scheme in which each central office switch in the public-switched telephone network is identified by a unique set of "NPA-NXX" digits. Number portability databases store LRN data, and are accessed to ensure proper routing of calls to ported directory numbers. A detailed explanation of LRNs, and call routing may be found in U.S. Pat. No. 5,475,749, assigned to AT&T.

The routing of calls to ported directory numbers is also affected when "call blocking" (also known as "code blocking") is initiated. Call blocking is a procedure in which only a portion of all telephone calls to a particular destination (e.g., a central office switch or directory number) is completed in accordance with a predetermined blocking scheme. Call blocking is initiated by network management personnel to control high call volumes to a particular destination. For example, call blocking may occur as a result of a natural disaster affecting a particular geographic region. Central office switches located in the affected region may be controlled by a block which allows only one call per second to terminate to customer lines served by the switch, wherein the normal termination rate is two calls per second. This type of blocking is used to reduce the high incoming call volume to affected switches so that subscribers served by the switch can use network resources to complete outgoing calls. The blocked calls receive either an "all circuits busy" announcement, or a fast busy signal.

Individuals who retain directory numbers ported from another switch are adversely affected by existing call blocking procedures directed to central office switches. This is because blocking an entire central office switch is based on "NPA-NXX" digits which identify the switch. In other words, incoming call volume is decreased by completing only a portion of the number of calls directed to directory numbers including blocked "NPA-NXX" digits. Unfortunately, a ported directory number customer who happens to retain "NPA-NXX" digits of a central office switch under call blocking controls will also have calls blocked. Therefore, there is a need in the art to exclude ported directory number customers adversely affected by call blocking controls.

SUMMARY OF THE INVENTION

This need is addressed, and a technological advance is achieved in the telecommunications art, by obtaining LRN data associated with a dialed directory number prior to initiating call blocking controls.

In the preferred embodiment, all switches in the telecommunications system are initialized with a call blocking control which utilizes an originating switch's query of a number portability database prior to processing calls. As a result, LRN data associated with ported directory numbers is retrieved, and analyzed, to determine whether the ported directory number is actually subject to the initialized call blocking control. Advantageously, if the ported directory number contains LRN data indicating that it is not subject to the call blocking control, the call directed to the ported directory number is exempted, and processed without call blocking controls.

DETAILED DESCRIPTION OF THE INVENTION

Figure 1:
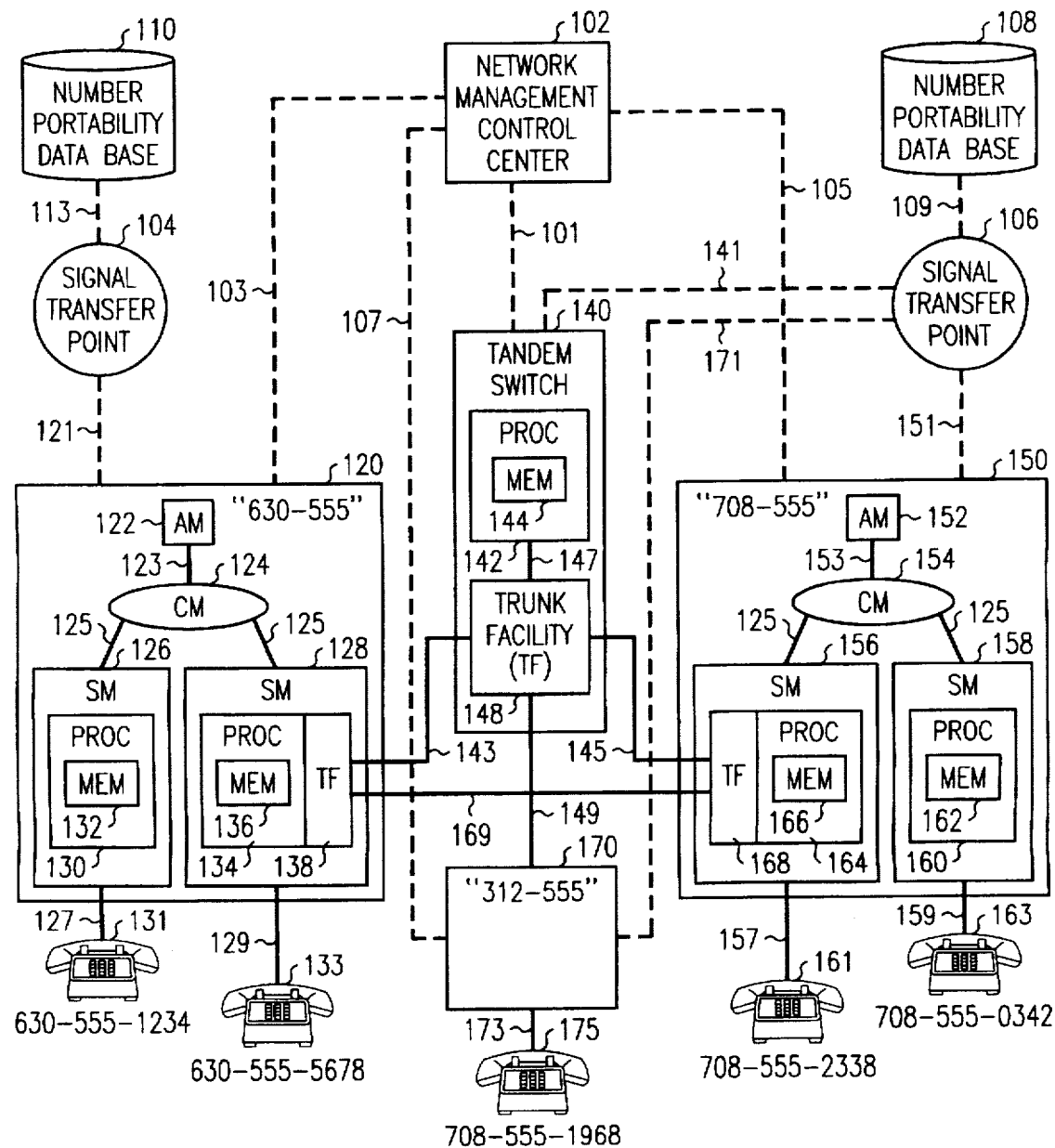
FIG. 1 is a simplified block diagram of a telecommunications network in which the method of the present invention may be practiced.

FIG. 1 shows a simplified block diagram of a telecommunications system in which the preferred embodiment of the method of the present invention may be practiced. For purposes of example, assume that the telecommunications system supports number portability. In other words, each central office switch is identified by a unique "NPA-NXX" digits.

Telecommunications system 100 comprises: network management control center 102; signal transfer points 104, 106; number portability data bases 108, 110; central office switches 120, 150,170; and tandem switch 140.

Network management control center 102 monitors telecommunications system 100, and is interconnected to central office switches 120, 150 and 170 via links 103, 105 and 107, respectively. Signal transfer points 104, 106 are interconnected to number portability data bases, and each switch in telecommunications system 100, via signaling links. More particularly, signal transfer point 104 is interconnected to number portability data base 110, and central office switch 120 via signaling links 113, 121, respectively. Similarly, signal transfer point 106 is interconnected to number portability data base 108, tandem switch 140 and central office switches 150, 170 via signaling links 109, 141, 151 and 171, respectively.

All switches in telecommunications system 100 are part of the greater public-switched telephone network (PSTN). In accordance with the LRN number portability scheme, each central office switch in the PSTN is identified by unique "NPA-NXX" digits, as described below. In the embodiment shown, central office switch 120 is interconnected to tandem switch 140 via bi-directional trunk 143, and is interconnected to central office switch 150 via established bi-directional trunk 169. Tandem switch 140 is interconnected to central office switches 150 and 170 via established bi-directional trunks 145 and 149, respectively. Tandem switch 140 does not serve individual customer lines but acts as a gateway switch to other switches within telecommunications system 100, and the PSTN. Since a tandem switch does not directly serve individual customer lines, it is not identified by NPA-NXX digits. In this example, tandem switch 140 comprises main processor 142 interconnected to trunking facility 148 via data link 147. Also shown is memory 144 for storing various control processes including call blocking controls.

In the preferred embodiment, central office switches 120, 150 and 170 are the 5ESS® switches manufactured, and sold by Lucent Technologies Inc. Central office switch 120 is identified by NPA-NXX digits "630-555," and comprises administrative module 122 interconnected to communications module 124 via communications link 123. Communications module 124 is interconnected to switch modules 126 and 128 via data links 125. In operational implementations, switch modules 126 and 128 serve a plurality of customer lines which terminate at customer premises equipment. In this embodiment, a single customer line per switch module is depicted for clarity. Each switch module stores customer data, and establishes calls for the customer lines which it serves. Switch module 126 includes processor 130 and data memory 132. Similarly, switch module 128 includes processor 134 and data memory 136. Switch module 128 also includes trunk facility 138 for interconnecting the central office switch to the rest of the PSTN. In the embodiment shown, switch module 126 serves customer line 127 terminating at telephone 131 identified by directory number 630-555-1234. Switch module 128 serves customer line 129 which terminates at a telephone 133, and is identified by directory number 630-555-5678.

Central office switch 150 is identified by NPA-NXX digits "708-555", and includes components similar to the components in central office switch 120. Particularly, central office switch 150 includes administrative module 152 interconnected to communications module 154 via communications link 153. Communications module 154 is interconnected to switch modules 156 and 158 via data links 155. Switch module 156 includes processor 164, data memory 166, and trunk facility 168. In the embodiment shown, switch module 156 serves customer line 157 which terminates at telephone 161 identified by directory number 708-555-2338. Switch module 158 comprises processor 160 and data memory 162. In this example, switch module 158 serves customer line 159 terminating at telephone 163 identified by directory number 708-555-0342.

Central office switch 170 is identified by NPA-NXX digits "312-555". The internal components of central office switch 170 are identical to those of central office switches 120 and 150. For purposes of explanation of the preferred embodiment of the present invention, it is sufficient to state that central office switch 170 serves customer line 173 which terminates at telephone 175 identified by directory number 708-555-1968. The directory number associated with telephone 175 does not match the NPA-NXX digits identifying central office switch 170. This is because the subscriber served by customer line 173 has ported a directory number from central office switch 150 to central office switch 170.

During normal operation of telecommunications system 100, all calls placed between customers served by central office switches 120, 150, 170, and other switches within the PSTN are completed. In some circumstances, however, it is necessary to decrease the call volume directed to a particular destination. For purposes of example, assume that natural disaster strikes the geographic area served by central office switch 150. As a result, concerned parties wishing to contact friends and relatives in the affected area place calls directed to central office switch 150. Simultaneously, those parties served by central office switch 150 may attempt to place outgoing calls to the concerned parties. To optimize switch resources for completing as many calls as possible, network management personnel institute a call blocking control directed to central office switch 150. In alternative embodiments, call blocking controls can be directed to other destinations, such as a plurality of central office switches or a particular directory number. In this example, the call blocking control is intended to limit the number of telephone calls which terminate at central office switch 150. More particularly, assume that network management personnel want to allow only one call per second to terminate to a customer line on the central office switch. During normal operation (that is, without call blocking controls), the call termination rate may be as high as three calls per second. The requirements of the call blocking control are formulated in network management control center 102, and downloaded to all switches in telecommunications system 100 via datalinks 101, 103, 105 and 107. In the preferred embodiment, the call blocking control accommodates ported directory numbers, as described below. Once received in a switch, the call blocking control is stored. In central office switches, the call blocking control is stored in the memory portion of the switch. In tandem switch 140, the call blocking control is stored in data memory 144. The central office switch which is blocked (in this case, central office switch 150) also receives the call blocking control but may receive a different control (such as, allowing two calls per second to terminate to a customer line). All call blocking controls significantly decrease call volumes destined for central office switch 150.

In this example, the call blocking control implemented by network control center 102 identifies calls to be blocked by NPA-NXX digits "708-555". Accordingly, all calls originating in telecommunications system 100 (and the rest of the PSTN) including dialed NPA-NXX digits "708-555" are subject to the call blocking control. However, there is a subscriber served by central office switch 170 (a non-blocked central office switch) who has a directory number comprising NPA-NXX digits "708-555". Although central office switch 170 is not subject to blocking (since it is not identified by NPA-NXX digits "708-555") it does serve at least one ported directory number customer having a directory number including digits "708-555" (that is, the customer served by customer line 173). Therefore, existing implementations of call blocking controls which block calls destined for directory numbers beginning with NPA-NXX digits "708-555" would result in blocking calls to ported directory number 708-555-1968 served by central office switch 170.

Figure 2:
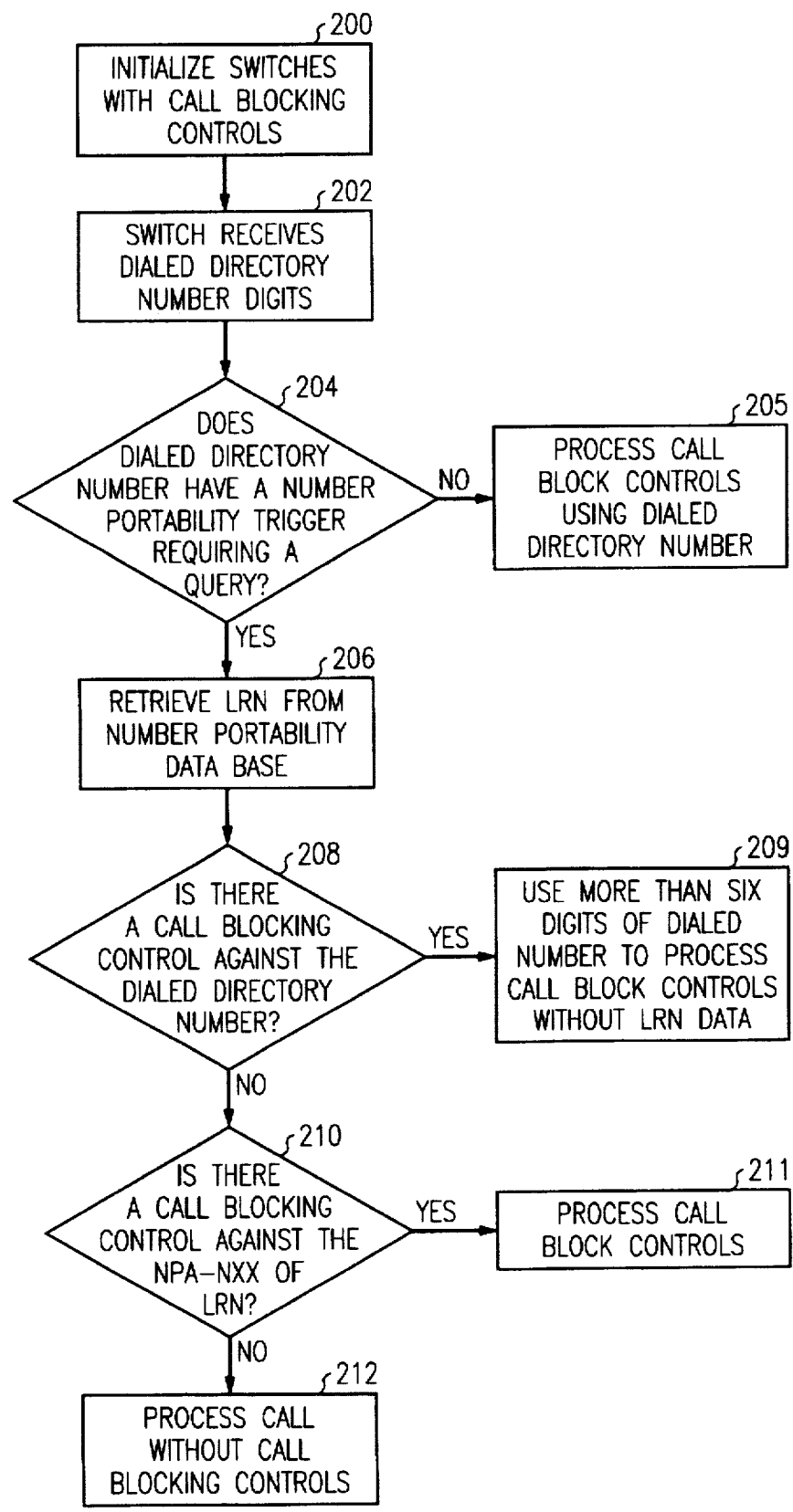
FIG. 2 is a flow diagram illustrating the steps performed in the telecommunications network of FIG. 1, in accordance with the preferred embodiment of the present invention.

FIG. 2 is a flow diagram illustrating the steps performed in telecommunications system 100 in accordance with the preferred embodiment in which call blocking controls include accommodations for ported directory numbers. For purposes of clarity, the example of a natural disaster affecting the geographic area served by central office switch 150 is continued. In accordance with the call blocking control, calls destined for directory numbers including NPA-NXX digits "708-555" (that is, calls to central office switch 150), are blocked so that only one call per second is terminated to a customer line served by the central office switch. Under normal, "un-blocked" circumstances, assume that three calls per second are terminated to customer lines served by central office switch 150. Due to the high volume of calls flowing to central office switch 150 as a result of the natural disaster, network management personnel determine that call blocking controls are necessary.

The process begins in step 200 in which all switches in telecommunications system 100 are initialized with the exemplary call blocking control. In this example, network management control center 102 uses datalinks 101, 103, 105 and 107 to initialize all switches in telecommunications system 100 with a call blocking control specifying calls destined to directory numbers including NPA-NXX digits "708-555" are subject to call blocking control. In alternative embodiments, call blocking controls may be initiated to block calls to a particular directory number, a plurality of central office switches, or any combination of the preceding.

The process continues to step 202 in which a switch (either a central office switch, or a tandem switch) receives a dialed directory number. In this example, assume that a caller at telephone 131 served by central office switch 120 wishes to call the customer served by customer line 173 of central office switch 170. Accordingly, the caller at telephone 131 dials directory number digits "708-555-1968" which is received in central office switch 120 (the "originating" switch). In decision step 204, the switch determines whether the dialed directory number requires a number portability database query. As is known in the art, ported directory numbers are identified by triggers stored in the switch (either a central office switch or a tandem switch). In this example, central office switch 120 determines whether the dialed directory number "708-555-1968" has a number portability trigger. Since the customer served by customer line 173 ported a directory number from central office switch 150, the dialed directory number does have a number portability trigger. If the outcome of decision step 204 is a "NO" determination, the process continues to step 205 in which the call is processed with call blocked controls using the entire ten-digit dialed directory number. If, as in this case, the outcome of decision step 204 is a "YES" determination, the process continues to step 206 in which the switch retrieves the LRN associated with the dialed directory number from a number portability database. In this embodiment, central office switch 120 retrieves LRN data from number portability database 110 via signaling transfer point 104, and signaling links 113, 121.

The process continues to decision step 208 in which the originating switch determines whether there is a call blocking control directed to the dialed directory number. In alternative embodiments, this determination can be made prior to retrieving LRN data from a number portability database. If the outcome of decision step 208 is a "YES" determination, the process continues to decision step 209 in which initialized call blocking controls are processed without using retrieved LRN data (that is, the call blocking control is processed at the greater than six-digit level of the dialed directory number). If the outcome of decision step 208 is a "NO" determination, the process continues to decision step 210 in which the originating switch determines whether there is a call blocking control against the NPA-NXX of the LRN. Although decision step 210 is directed to NPA-NXX digits, alternative embodiments may have call blocking controls directed to more than the NPA-NXX digits of the LRN. If the outcome of decision step 210 is a "YES" determination, the process continues to step 211 in which the initialized call blocking controls are processed using LRN data. If the outcome of decision step 210 is a "NO" determination, the process continues to step 212 in which the call is processed without using the initialized call blocking controls.

In this example, central office switch serving the ported directory number "708-555-1968" is identified by NPA-NXX digits "312-555". Accordingly, the LRN of the dialed directory number identifies NPA-NXX digits "312-555". Since "312-555" is not identified as a blocked destination, customer lines served by central office switch 170 are not subject to the call blocking controls. In other words, in this example, the outcome of decision step 210 is a "NO" determination because the customer served by customer line 173 is associated with NPA-NXX digits "312-555" which are not subject to the initialized call blocking controls.

Advantageously, the preferred embodiment allows minimum alternation of existing call blocking controls but accommodates ported directory numbers, such as ported directory number "708-555-1968" which may be affected by call blocking controls based on NPA-NXX digits Although this invention has been described with respect to an illustrative embodiment, those skilled in the art may devise numerous other arrangements which do not depart from the scope of this invention.

What is claimed is:

1. In a telecommunications system comprised of a plurality of switches, a method for implementing call blocking controls comprises the steps of:

initializing at least one switch in the telecommunications system with call blocking controls;

the initialized switch retrieving data from a number portability data base responsive to receiving dialed digits; and the initialized switch exempting ported directory numbers from the call blocking control using data retrieved from the number portability database.

2. The method of claim 1 wherein the step of initializing at least one switch in the telecommunications system with call blocking controls comprises the step of:

establishing a call blocking control on the basis of NPA-NXX digits.

3. The method of claim 1 wherein the step of:

the switch retrieving data from a number portability data base comprises the step of:

retrieving a location routing number from the number portability data base, wherein the location routing number identifies a central office switch which serves the ported directory number.

4. In a telecommunications system comprising a plurality of switches, wherein a first switch experiences a substantially higher call volume than other switches in the telecommunications system, a method for controlling calls which terminate at the first switch comprises the steps of:

initializing switches in the telecommunications system with a call blocking control affecting directory numbers served by the first switch;

receiving dialed digits in a second switch, wherein the dialed digits identify the first switch; and the second switch retrieving data from a number portability data base responsive to receiving the dialed digits, and subsequently implementing the call blocking control.

5. The method of claim 4 further comprising the step of:

the second switch exempting the dialed digits from the call blocking control based on the data retrieved from the number portability database.

6. The method of claim 4 further comprising the step of:

the first switch receiving dialed digits; and the first switch exempting the dialed digits from the call blocking control.

7. A telecommunications switch comprises:

means for establishing call connections between a customer line served by the switch, and other nodes of a public-switched telephone network;

means for receiving a call blocking control directed to a particular destination, wherein the call blocking control is based on NPA-NXX digits of a dialed directory number; and means for retrieving data from a number portability database, wherein the data retrieved is used to determine whether the dialed directory number is exempt from the call blocking control.

* * * * *